United States Patent [19]

Tokuda

[11] Patent Number: 5,295,322

[45] Date of Patent: Mar. 22, 1994

[54] TELESCOPIC FISHING ROD WITH INTEGRALLY FORMED BUTT RING MEMBER

[75] Inventor: Isamu Tokuda, Sakai, Japan

[73] Assignee: Shimano, Inc., Osaka, Japan

[21] Appl. No.: 809

[22] Filed: Jan. 5, 1993

Related U.S. Application Data

[63] Continuation of Ser. No. 745,873, Aug. 16, 1992, abandoned.

[30] Foreign Application Priority Data

Aug. 28, 1990 [JP] Japan ................. 2-90305[U]

[51] Int. Cl.$^5$ ................. A01K 87/08; A01K 87/04
[52] U.S. Cl. ................. 43/23; 43/24
[58] Field of Search ................. 43/8.1, 20, 24, 23

[56] References Cited

U.S. PATENT DOCUMENTS

| | | |
|---|---|---|
| 4,403,439 | 9/1983 | Wallace ................. 43/18.1 |
| 4,520,587 | 6/1985 | Wallace ................. 43/18.1 |
| 4,646,462 | 3/1987 | Ohmura ................. 43/18.1 |
| 4,697,376 | 10/1987 | Brackett et al. ................. 43/18.1 |
| 4,738,046 | 4/1988 | Fraylick et al. ................. 43/18.1 |
| 4,762,584 | 8/1988 | Andreasen et al. ................. 43/22 X |
| 4,839,981 | 6/1989 | Yasui ................. 43/18.1 |
| 4,860,485 | 8/1989 | Rhoton et al. ................. 43/24 |

FOREIGN PATENT DOCUMENTS

| | | |
|---|---|---|
| 2039115 | 2/1972 | Fed. Rep. of Germany ....... 43/18.1 |
| 1126698 | 11/1956 | France ................. 43/18.1 |
| 2102545 | 4/1972 | France ................. 43/18.1 |
| 62-257330 | 11/1987 | Japan ................. 43/18.1 |
| 2209913 | 6/1989 | United Kingdom . |

*Primary Examiner*—Paula A. Bradley
*Assistant Examiner*—Jeanne M. Elpel
*Attorney, Agent, or Firm*—Dickstein, Shapiro & Morin

[57] ABSTRACT

A fishing rod includes a butt ring member integrally formed and fixed on a rear end of a rod body. The integral formation is preferably done by use of a mold. The fishing rod may include a molded line guide. The fishing rod may also include a molded reel seat.

5 Claims, 1 Drawing Sheet

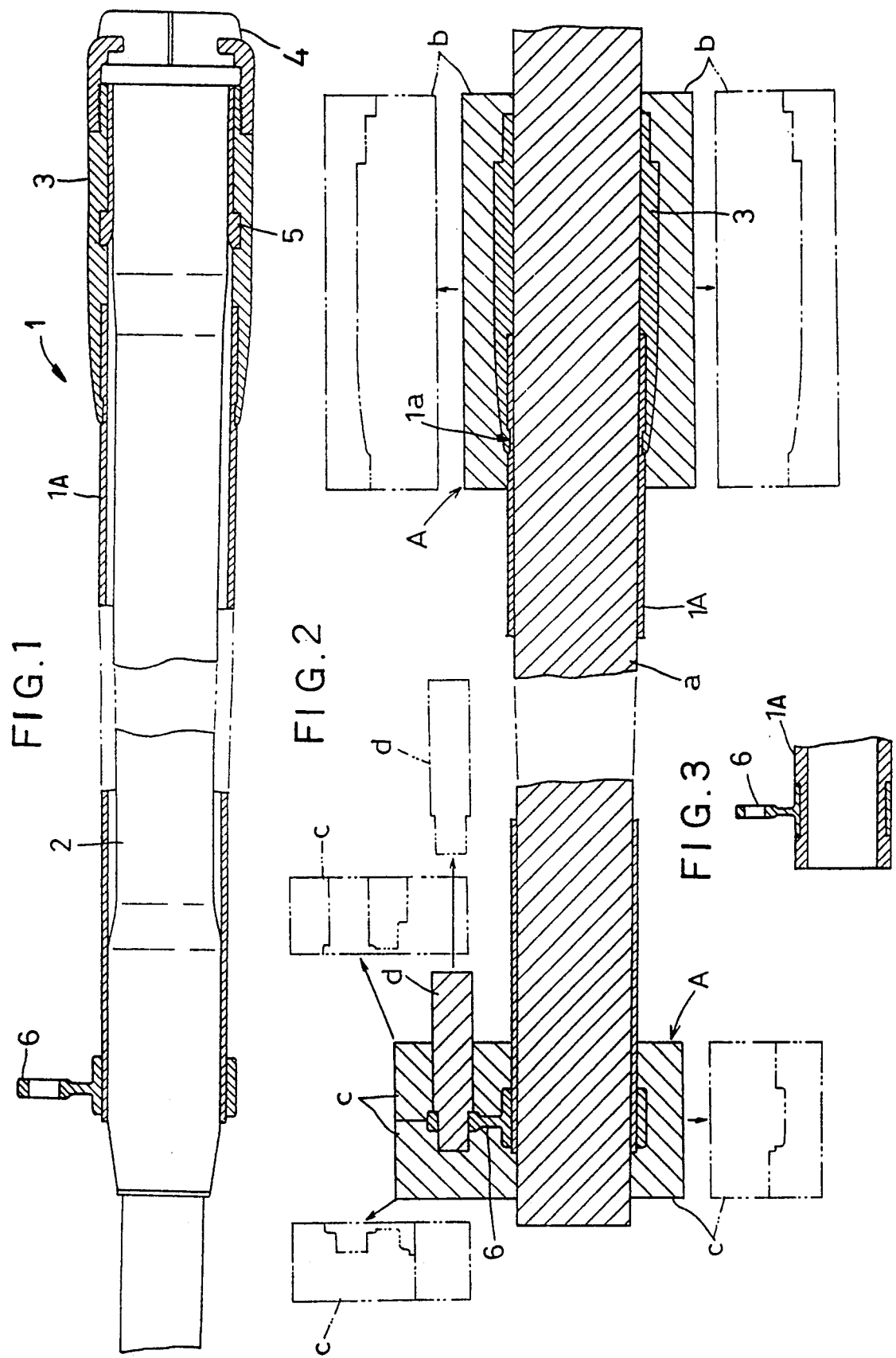

TELESCOPIC FISHING ROD WITH INTEGRALLY FORMED BUTT RING MEMBER

This application is a continuation of application Ser. No. 07/745,873 filed Aug. 16, 1992, now abandoned.

BACKGROUND OF THE INVENTION

1. Field of the Invention

The present invention relates to a fishing rod and its manufacturing method.

2. Description of the Related Art

Conventionally, an adhesive agent is used for affixing to a rod body a butt ring member which forms a butt grip. Fixation of a line guide is also done in the same manner.

However, before affixing the butt grip to the rod body, an appropriate cutting process must be effected at a portion of the rod body where the grip is to be affixed, while precisely setting an engagement tolerance between the rod body and the butt grip. Especially, where the rod body is formed by winding of a prepreg and further winding of a tape on the wound prepreg, such surface cutting operation is an absolute necessity since the surface of the wound tape is too slippery for the adhesive. The cutting process tends to be time and labor consuming; and further the adhesive agent must be applied evenly on the cut surface.

The object of the present invention is to provide an improved fishing rod which can be manufactured in a less time-labor consuming manner and also always in a good quality, by forming the butt grip integrally with the rod body.

SUMMARY OF THE INVENTION

For accomplishing the above-noted object, a fishing rod according to the present invention, comprises:
- a rod body; and
- a butt ring member which is integrally and fixedly formed at a rear end of the rod body by means of a mold.

A method of manufacturing a fishing rod, according to the present invention, comprises the steps of:
- forming a rod body;
- fitting an inner mold inside the rod body along an entire length of the rod body;
- fitting an outer mold onto the rod body; and
- introducing a resin into a gate of a mold unit formed by said inner mold and said outer mold so as to integrally and fixedly form a butt ring member at a rear end of said rod body.

Functions and effects of these features of the present invention will be described next.

Because of the use of the mold unit, the formation step and the fixation step of the butt ring member are carried out at one time, without having to effect cutting and finishing processes on the surface of the rod body portion where the butt is to be provided.

Accordingly, the invention has eliminated the troublesome process of cutting and finishing the rod body surface for the engagement with the butt ring member, thereby significantly reducing the manufacturing time and costs.

Moreover, due to the high temperature and high pressure used during the molding process, the fixation of the butt ring member can be stronger than that using an adhesive agent. Accordingly, the invention's construction can more effectively prevent inadvertent detachment of the butt grip member from the rod body.

Preferably, at a front end of the rod body, there is provided a line guide which is also integrally formed with the rod body. With this additional feature, inadvertent detachment of the line guide, which conventionally tends to detach from the rod body because of strong bending force from the line and the body, can be effectively avoided as well.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate preferred embodiments of a fishing rod and its manufacturing method relating to the present invention; in which, FIG. 1 is a side view in vertical section showing a butt grip of a fishing rod, FIG. 2 is a side view in vertical section illustrating integral formation of a line guide and a butt ring member on a rod body, and FIG. 3 is a side view in vertical section illustrating attachment condition of a line guide relating to an alternate embodiment of the present invention.

DESCRIPTION OF THE PREFERRED EMBODIMENTS

Preferred embodiments of a fishing rod and its manufacturing method relating to the present invention will now be described in detail with reference to the accompanying drawings.

FIG. 1 shows a fishing rod of a first embodiment. This rod is a telescopic type fishing rod. The rod includes a butt section 1, an intermediate section 2 which is projectable and retractable relative to the butt section 1 and a line guide 6 provided at a leading end of the butt section 1. Further, a butt ring member 3 is provided on a butt of the butt section 1 and a butt cap 4 is thread-fitted on this butt ring member 3. A reference numeral 5 denotes a snap-on ring for retaining the intermediate section 2.

The intermediate section 2 is shown in its retracted position in FIG. 1. In the retracted position, the rear end of the intermediate section 2 is frictionally retained within the snap ring 5, and a forward end of the intermediate section 2 is retained within the front end of the rod body 1A in the vicinity of the line guide 6.

Next, a forming process of the butt ring member 3 and the line guide 6 will be described. First, there will be described a manufacturing process of the rod body 1A on which the butt ring member 3 and the line guide 6 are to be attached.

(a) A prepreg is prepared by impregnating a resin into a reinforced carbon fiber turned and aligned in the peripheral direction. And, one ply of this prepreg as a first layer is wound about a mandrel. Next, a further prepreg is prepared by turning and aligning the fiber in the axial direction. And, two plies of this further prepreg is wound, as a second layer, about the first layer. Next, another ply of the first-mentioned prepreg as a third layer is wound on the second layer, so as to form a cylinder member.

(b) A winding tape is turned about an outer periphery of the cylinder member. And, this is baked and cut.

Thereafter, the tape is detached from the cylinder member to form the rod body 1A.

Preferably, a further ply of the peripherally aligned fiber is wound about the rod body 1A. This is advantageous for providing the rod body with stronger resistance against cracking which may otherwise occur due to compression associated with cooling of the resin layers.

(c) Then, the butt ring member 3 and the line guide 6 are integrally and fixedly formed with the above-described rod body 1A. More specifically, as illustrated in FIG. 2, an injection molding is carried out by using a mold unit A. This mold unit A consists essentially of an inner mold (a) to be fitted inside the rod body 1A through an entire length of the body 1A and a two-part split type outer body (b) to be fitted on the rod body 1A. Then, the resin is introduced through a gate of the mold body A, thus integrally forming the butt ring member 3 at the rear end of the rod body 1A. Further, a recess 1a is defined in the outer periphery of the rod body 1A so as to receive the introduced resin, so that the resin received at this recess prevents detachment of the butt ring member 3.

(d) The inner mold (a) is inserted into the rod body 1A until its leading end. Then, a three-part split type outer mold (c) is fitted on the rod body 1A so as to integrally form the line guide 6 by effecting a resin injection molding process. A reference mark (d) denotes a mold aid for forming a line-inserting hole of the line guide 6.

Through the above-described steps, the butt ring member 3 and the line guide 6 are integrally formed on the rod body 1A. The resin used for the injection molding steps is usually a thermoplastic resin, which resin is molded under a high temperature and a high pressure and contracts when cooled to the room temperature. Accordingly, the ring member 3 and the guide 6 can be fixed to the rod body 1A much more strongly than when these are fixed by using an adhesive agent. In the above, attachment of a reel seat was not described. However, it is conceivable to attach the reel seat in the same manner as described above. Further, it is also conceivable to form the line guide 6, the reel seat and the butt ring member 3 by using one mold.

In the foregoing, the resin is introduced into the recess 1a defined in the outer periphery of the rod body 1A for preventing the detachment of the butt ring member 3 therefrom. In this respect, a tape is usually wound in a crossing pattern on the outer periphery of the rod body 1A thus forming an uneveness on the periphery. Therefore, this uneveness can be utilized for receiving the resin for the prevention of the detachment. In this case, the recess 1a can be eliminated.

Some other embodiments of the present invention will be specifically described next.

(i) The use of the mold unit A can be limited to the formation of only one of the butt ring member 3 and the line guide 6.

(ii) As illustrated in FIG. 3, it is conceivable to define a groove at the portion of the outer periphery of the butt section 1 where the line guide 6 is to be attached, so that a base end of the attaching portion of the line guide 6 to the butt section 1 is fitted into the groove for preventing detachment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A telescopic fishing rod, comprising:
    a butt section (1) which includes a rod portion (1A) and a butt ring body (3), said rod portion having a rear end with a circumferential surface, and wherein said butt ring body includes a first butt ring portion integrally formed on said circumferential surface by a resin injection molding process, and wherein said butt ring body further includes a second butt ring portion which extends rearwardly of said first butt ring portion, said second butt ring portion having a rear end;
    a retractable section (2) located within said rod portion (1A); and
    a butt cap (4) engaged with said rear end of said second butt ring portion.

2. A fishing rod as claimed in claim 1, wherein a circumferential recess (1a) is formed on at least one part of said rear end of said rod portion (1A), with said first butt ring portion of said butt ring body (3) being formed on said rod portion with one part of said first butt ring portion being located within said recess.

3. A fishing rod as claimed in claim 1, wherein said retractable section (2) is slidably received within said butt section (1), and wherein said retractable section has a rear end, and wherein said fishing rod further includes a stop ring (5) for engaging said rear end of said retractable section, and wherein the inner diameter of said stop ring is smaller than the inner diameter of said rod portion (1A).

4. A fishing rod as claimed in claim 1, wherein a surface portion of said rod portion (1A) is formed of reinforcing fiber, with said reinforcing fiber being oriented circumferentially of said rod portion.

5. A fishing rod as claimed in claim 1, wherein said rod portion (1A) is integrally provided with a line guide (6) by a resin injection molding process.

* * * * *